June 6, 1967     W. L. McCANN ET AL     3,323,789
ROTARY AIR LIFT TABLE FOR MACHINE TOOLS
Filed July 17, 1964     3 Sheets-Sheet 1

INVENTORS.
WALTER L. McCANN
GORDON H. JONES
EVERETT E. HOSEA
BY Wolfe, Hubbard, Voit & Osann
ATTORNEYS.

United States Patent Office 3,323,789
Patented June 6, 1967

3,323,789
ROTARY AIR LIFT TABLE FOR MACHINE TOOLS
Walter L. McCann and Gordon H. Jones, Fond du Lac, and Everett E. Hosea, Butte des Moris, Wis., assignors to Giddings & Lewis Machine Tool Company, Fond du Lac, Wis., a corporation of Wisconsin
Filed July 17, 1964, Ser. No. 383,436
9 Claims. (Cl. 269—35)

The present invention relates to rotary index tables for machine tools, and, more particularly, to such a table with an air lift system to facilitate indexing movement.

Rotary index tables of the air lift type such, for example, as disclosed in Schurger patent No. 2,787,175, have received wide acceptance in industry. This is largely because they constitute a relatively inexpensive means through which workpieces can be manually indexed to present all sides to a tool spindle. The air lift system, which is actually a plurality of spaced apart air bearings, enables the machine tool operator to minimize the manual effort required for indexing.

While air lift tables of the character known heretofore are capable of operating satisfactorily with some off-center loads, considerable difficulty has been experienced in tables with relatively heavy workpieces situated in off-center positions relative to the vertical axis of the table. This tends to cause tilting of the table and in some instances such tilting is severe enough to destroy the effectiveness of the air bearings and make them incapable of supporting the table for friction-free rotation.

With the foregoing in mind, it is an object of the present invention to provide a rotary index table selectively liftable for indexing on a bearing cushion of air or other fluid, and which is also fully operative even through the load thereon is considerably unbalanced.

Another object is to provide a rotary index air lift table of the character set forth wherein the worktable or platen does not tip appreciably even under severe asymmetric loading and may be readily indexed upon application of substantially the same air pressure required for a centered load.

A further object, related to the above, is to provide such a table which is capable of being easily indexed though under greater asymmetrical loading than was possible in tables of the type known heretofore.

These, as well as other advantageous features of the present invention will become apparent from the following detailed description, taken in conjunction with the appended drawings, wherein.

Figure 1:
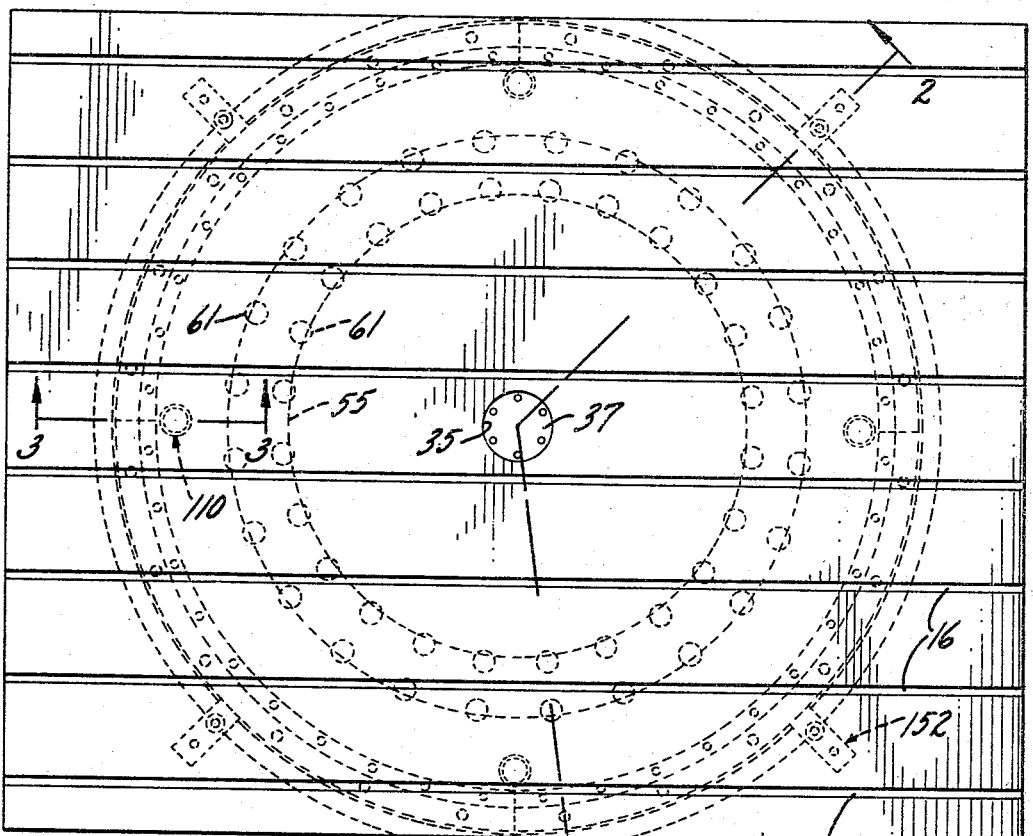
FIGURE 1 is a plan view of an illustrative machine tool table constructed in accordance with the present invention.

While the invention is susceptible of various modifications and alternative constructions, a certain illustrative embodiment has been shown in the drawings and will be described below in considerable detail. It should be understood, however, that there is no intention to limit the invention to the specific form or mode disclosed, but, on the contrary, the intention is to cover all modifications, alternatives and equivalents falling within the spirit and scope of the invention as expressed in the appended claims.

Figure 2:
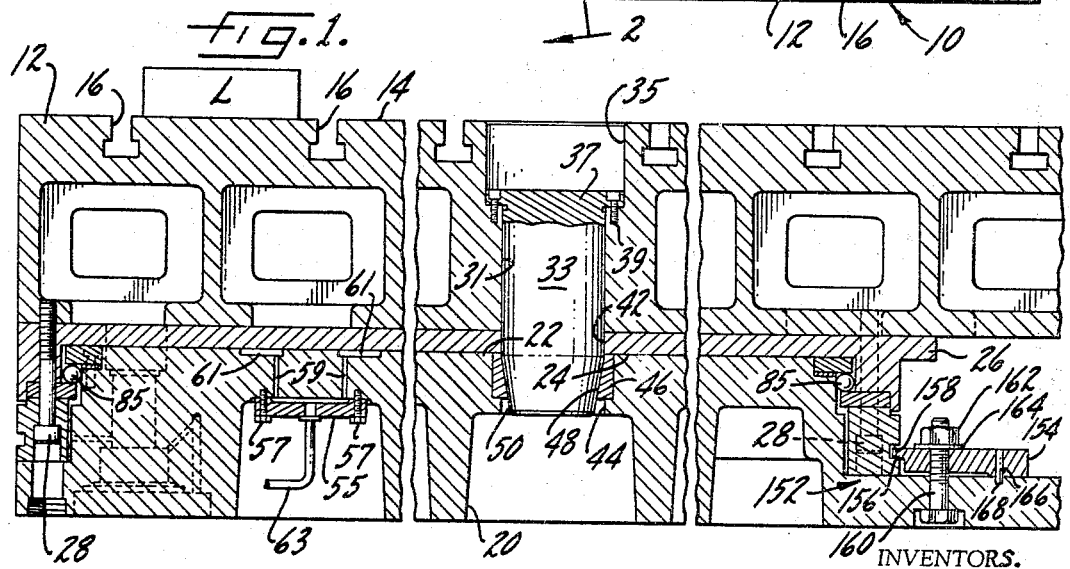
FIG. 2 is a fragmentary vertical sectional view through the table, taken in the planes of the line 2—2 in FIG. 1.

Referring more particularly to FIGS. 1 and 2, the invention is there exemplified in a rotary index table 10 which may be used to support a workpiece relative to the tool spindle of a machine tool such as a horizontal boring, drilling and milling machine (not shown). The table 10 comprises a worktable or platen 12 having a flat finished upper surface 14 formed with a plurality of spaced apart inverted T-slots 16. Clamps engaging the slots 16 are applied to a workpiece in a well-known manner for holding the same on the surface 14 for machining. The platen 12 may be of any suitable shape and in the present instance happens to be rectangular as shown in FIG. 1.

The worktable or platen 12 is pivotally supported upon a base member 20, which, in turn, may be mounted on or adjacent the machine in any suitable manner. The base 20 is formed at its top with a flat horizontal supporting surface 22 which is adapted to abuttingly engage a corresponding opposed flat surface 24 on an intermediate member 26. The latter is rigidly attached to the underside of the platen as by means of screws 28. When the platen 12 is at rest, the surfaces 22 and 24 are in abutting face-to-face relationship, providing a substantial area of frictional contact which assists in steadying the platen upon the base.

To establish the pivotal connection between the platen and the base, the platen is formed in this instance with a centrally disposed bore 31 through which a suitable center post, in the form of a stub shaft 33, extends. The bore 31 is counterbored as at 35 to an appropriate depth, and the stub shaft 33 has a flanged portion 37 at one end fastened in the counterbore of the platen as by means of screws 39 so as not to interfere with workpiece placement. A like diameter bore 42 is formed in the intermediate member 26 so that the shaft may extend therethrough. The base 20 is provided with a suitable bore 44 into which a tapered bearing 46 is fitted for receipt of the shaft. The stub shaft 33 is sufficiently long so that with the table in its normal position, at rest on the base, the nose 50 of the stub shaft, which in this case has a generally frusto-conical profile (as seen in FIG. 2) nests securely in the bearing 46 which has a complementary tapered bearing surface 48.

Compressed air for lifting the worktable or platen 12 to permit indexing thereof is supplied via an annular manifold plate 55 which is fastened to the underside of the base by means of machine screws 57. Air is transmitted from the manifold by passages 59 in the base and thence into shallow air lift pads or pockets 61 formed in the supporting surface 22 of the base. A suitable number of air lift pockets 61 is disposed in radially and circumferentialy spaced relation about the center post 33 at convenient distances outwardly therefrom.

Compressed air may be supplied to the manifold 55 via supply conduit 63 and an appropriate control valve (not shown).

In the air lift tables of the type known heretofore, application of air pressure to the air lift pockets causes the worktable or platen to lift from the base by a slight amount, on the order of a few thousandths of an inch, on a supporting cushion of air in the resulting clearance space. This separation of the platen and base is also accompanied by moderate air pressure losses around the opposed peripheral surfaces of the platen and base. Where the workpiece is centered or disposed so as to apply a symmetrical load on the platen, these pressure losses are minimal and substantially uniformly distributed about the opposed peripheral surfaces of the platen and base, with the result that sufficient air pressure builds up between the platen and base to carry the weight of the platen and the workpiece mounted thereon. Where the workpiece is of such a nature or is so mounted that a substantial off-center or asymmetrical load is applied to the platen, however, the platen tends to tilt to such an extent that excessive clearance develops between the opposed surfaces of the platen and base in the area remote from the load. This, in turn, causes excessive air pressure loss and insufficient air pressure build-up between the opposed platen and base surfaces to carry the load. These losses may be so great that the opposed platen and base surfaces remain in contact at the area of greatest load concentration, making it exceedingly difficult or impossible to rotate the platen.

In accordance with the present invention, provision is made for positively defining the maximum separation or lift distance between the opposed surfaces of the worktable or platen and base and thereby precluding any tilting of the platen in excess of that distance with excessive air pressure loss, even when the platen is asymmetrically loaded. Stated another way, provision is made for establishing a predetermined maximum separation distance about the entire periphery of the opposed platen and base surfaces 22, 24, minimizing air loss and facilitating pressure build-up sufficient to lift the platen and workpiece even when the latter is producing an asymmetrical load on the platen. This is accomplished in a simple, yet effective manner by interposing between the outer peripheral portions of the platen and the base a device in the nature of an anti-friction thrust bearing having an internal clearance equal to the predetermined maximum separation distance between the platen and base surfaces 22, 24. In the present instance this distance happens to be approximately .0025 inch.

Figure 3:
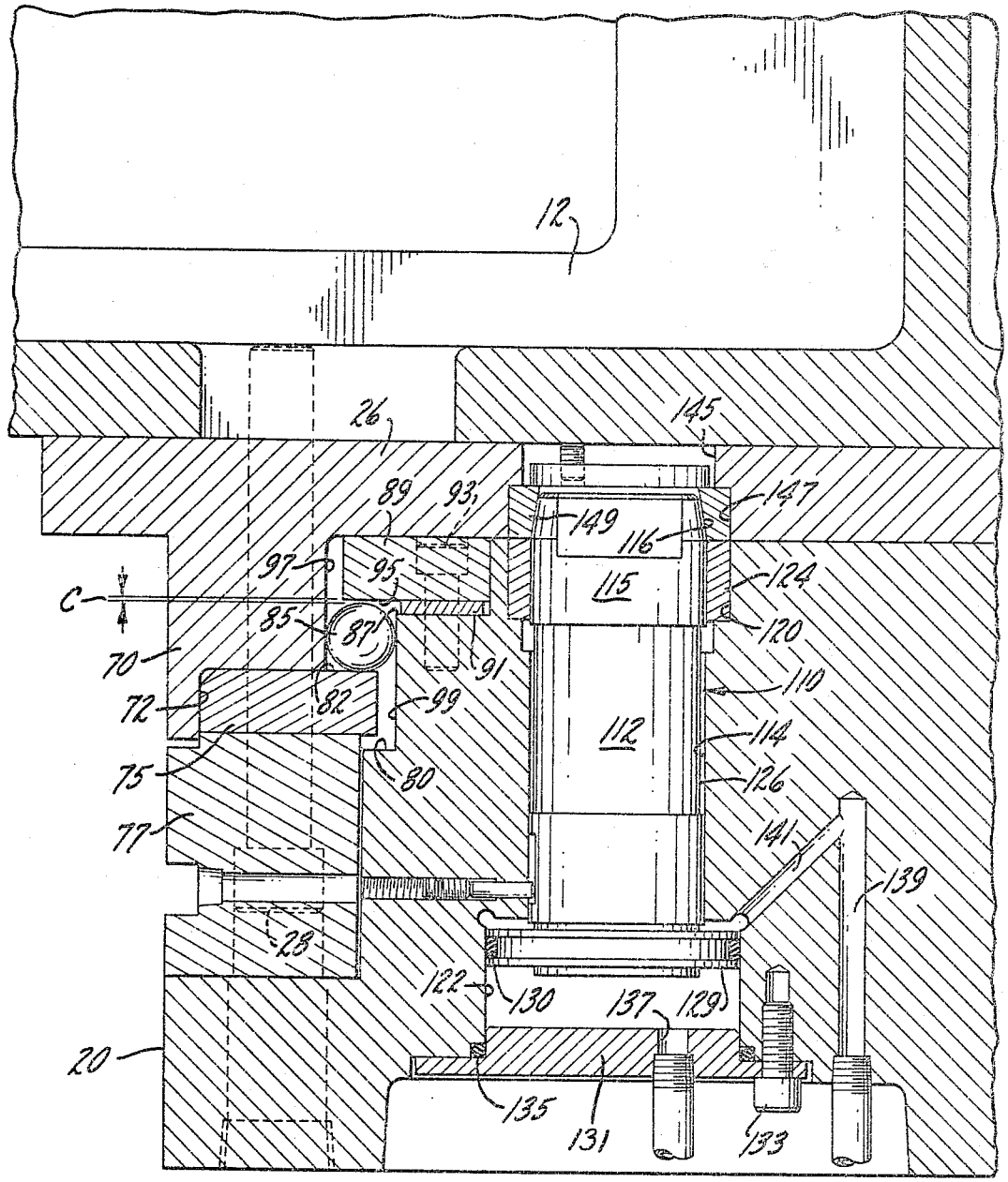
FIG. 3 is an enlarged fragmentary vertical sectional view through the outer peripheral portion of the illustrative table, taken in the plane of the line 3—3 of FIG. 1, with the worktable in its lowered position resting on the base.

Referring more particularly to FIGS. 2 and 3, it will be noted that the intermediate member 26 on the platen is formed with a relatively thick depending annular flange 70. A portion of the flange 70 is cut away, as at 72, and a relatively heavy annular raceway 75 is secured therein. The raceway 75 may be made in sections for ease of manufacture and assembly and in this case comprises four arcuate segments. A relatively heavy spacer ring 77 abuts against the lower face of the raceway 75 and a plurality of large screws 28, which pass through the spacer ring 77, the raceway 75, and the flange 70, hold the entire assembly in rigid engagement with the platen 12. The raceway 75 extends inwardly toward the base into a space defined above annular ledge 80 on the base. The upper surface 82 of the raceway 75 is highly finished and hardened to form a way for a plurality of antifriction elements such as ball bearings 85.

Secured to the base 20 on a ledge 87 is a second annular raceway 89. A spacer member 91 is interposed between the ledge 87 and the raceway 89, both being fastened to the base as by means of screws 93. The raceway 89, which may also be formed in annular segments, projects into the space between the flange 70 and the base and overlies the raceway 75. The underside 95 of the raceway 89 is finished and hardened to form a second way for the ball bearings 85, overlying the first way.

In keeping with the invention, the balls 85 do not engage both raceways when the platen is in its lowered or fixed position but simply rest upon the lower raceway 75 and clear the underside 95 of the upper raceway 89 by a clearance distance C (FIG. 3). The clearance distance C defines the predetermined maximum separation distance between the opposed surfaces 22, 24 of the platen and the base. It may be established by selection of the thickness of the spacer member 91 and in the present instance is approximately .0025 inch. The ball bearings 85 may be retained laterally between the raceways 75, 89 by the inner vertical side wall of the depending flange 70, and the vertical side wall 99 of the base. The space between these walls is preferably only slightly greater than the diameter of the ball bearings so as to minimize lateral movement without sacrificing freedom of rotation.

Figure 4:
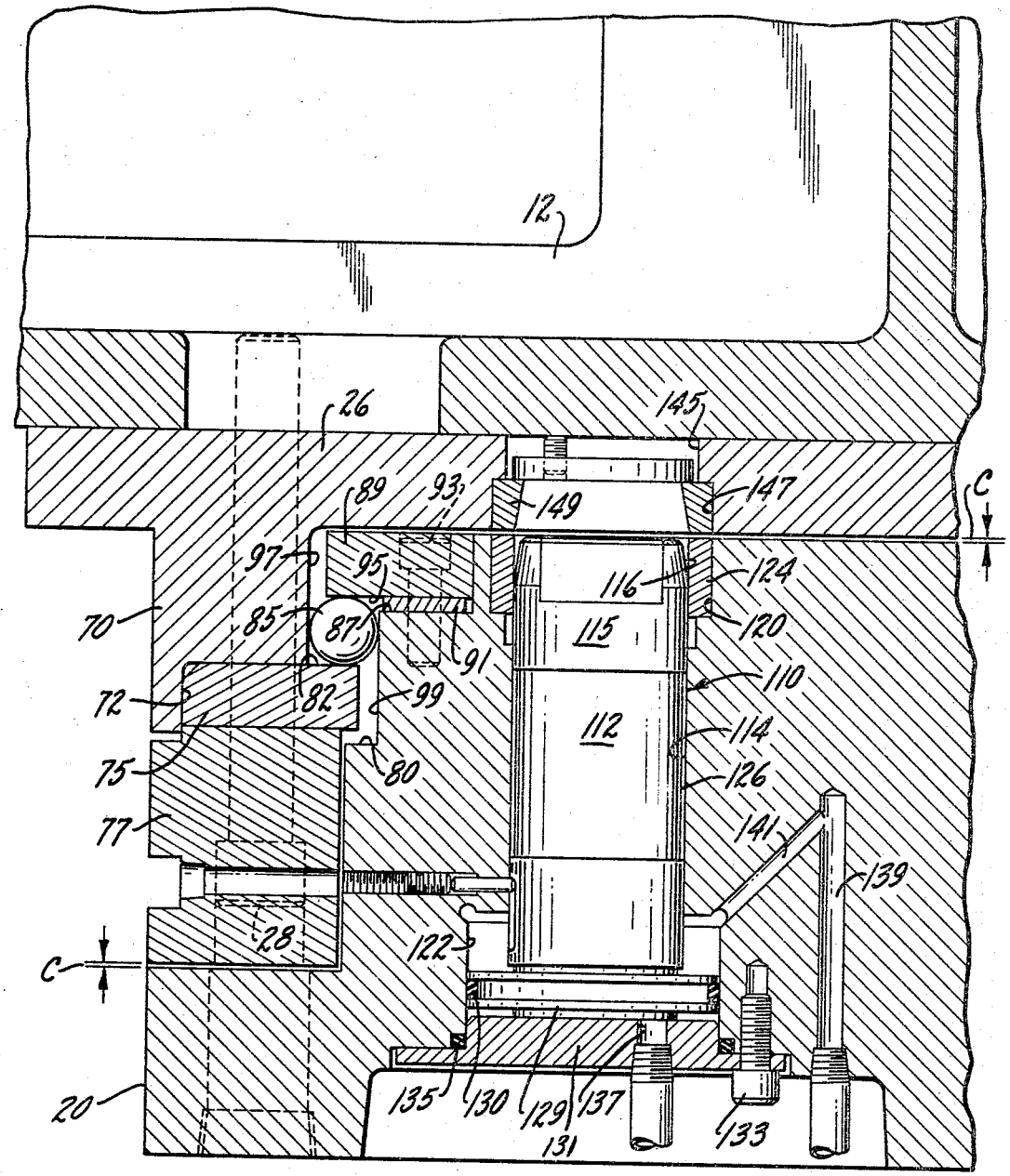
FIG. 4 is a view similar to FIG. 3 but showing the worktable in its air lift position ready for indexing.

The operation of the table 10 will be more readily followed upon comparison of FIGS. 3 and 4. As air pressure is applied via conduit 63 and manifold 55 to the pockets 61 between the platen and the base, the pressure build-up will cause the platen to lift. The raceway 75, which is fixed to the platen, will lift with it carrying the bearing elements 85 upwardly through the clearance distance C and into contact with the underside 95 of the upper raceway 89 (FIG. 4). This positively limits further lifting of the platen and also limits maximum separation of the opposed surfaces 22, 24 of the platen and base to an amount equal to the clearance distance C. Since the bearing defined by the raceways 75, 89 and the ball elements 85 is continuous and situated close to the outer periphery of the base, it is effective whether the workpiece is applying a centered or an asymmetrical load on the platen. Tilting of the platen under an asymmetrical load is limited to the predetermined maximum separation distance C which holds the peripheral air pressure losses to a tolerable level and insures complete lifting of the loaded platen. When air lifted in this manner, the platen may be readily indexed manually, irrespective of load position. After indexing, the air lift is shut off and the platen is permitted to drop into contact with the base.

In order to locate the worktable or platen 12 accurately in any one of a plurality of selected angular index positions, the table is provided with a power operated index pin assembly 110. Referring more particularly to FIG. 3, it will be noted that the assembly 110 comprises a relatively heavy index pin 112 slidably housed in a cylindrical bore 114 toward the outer periphery of the base 20. The index pin 112 is formed with a head 115 tapered as at 116 near its upper end so as to permit its easy insertion into the platen. The bore 114 terminates in a counterbore 120 at its upper end (viewing the same in FIG. 3) and in a counterbore 122 at its lower end. A bushing 124 is mounted in the counterbore 120 for maintaining alignment of the head 115. The index pin 112 has a center section 126 of slightly reduced diameter, and a suitable lubricant may be provided in the space between the bore 114 and the center section. The lower end of the pin 112 projects into counterbore 122 at the lower end of the base and has a piston 129 fixed thereto in any suitable manner. The piston 129 includes an O-ring 130 and is adapted to ride in the counterbore 122 which serves as a cylinder. A cap 131 is fitted into the bottom of the counterbore 122, and there held by screws 133. A suitable O-ring assembly 135 is provided as a pressure seal and a passage 137 is also provided in the cap member to permit the application and/or exhaustion of pressure fluid against the lower face of the piston 129. Additional passages 139, 141 in the base communicate with the top of the counterbore 122 above the piston. Thus, by suitable application of pressure between the passages 137 and 139 the piston may be reciprocated in the cylinder to retract or project the index pin 112.

For cooperation with the stop pin 112, the platen is formed with a plurality of circumferentially spaced bores 145 each corresponding to one indexed position. Each bore 145 is counterbored as at 147 and a bushing 149 is provided for receiving the chamfered portion 116 of the head 115 of the index pin. Thus, with the platen supported for indexing, it may be rotated either manually or by power until the index pin 112 is aligned with a bore 145 corresponding to a selected index position. Pressure fluid is then applied through conduit 137 against the bottom of piston 129 which causes the index pin to move upwardly and into the bushing 149. Any slight misalignment is taken up by the chamfer which guides the head of the pin into the bushing 149. Once the pin is in place the air pressure through conduit 63 is relieved and the platen is brought to rest upon the supporting surface 22 of the base.

Once the platen has been indexed and returned to rest upon the supporting surface 22, additional clamping may be used to lock the platen in position so as to better resist machining forces on the workpiece which might otherwise tend to move the platen slightly. To this end, as shown in FIG. 2, a manual clamping arrangement 152 is provided. While any number of suitable clamps will suffice, the present clamp is of simple construction and comprises a clamping member 154 having a tang 156 which may be fitted into a groove 158 formed in the member 77 fastened to the platen. A bolt 160 passes through the base member and through an appropriate hole, intermediate the ends of the clamping member 154. A nut 162 and washer 164 permit tightening down to the clamping member 154 against the base. The clamping member is also provided with a positioning key 166 and appropriate slot 168 in the base to initially position the clamp with respect to the slot 158. When tightened down the tang 156 presses against the bottom of the slot 158, thereby holding the platen in position. Any required number of such clamps may be situated about the periphery of the intermediate member 26 fastened to the platen, although one only is shown here.

We claim as our invention:

1. A rotary index table for a machine tool and comprising, in combination, a base, a platen, a center post mounting said platen to said base for limited vertical movement and relative rotation with respect thereto, said platen and said base having opposed unlubricated support surfaces, means on said platen defining a first annular raceway disposed in a lateral plane thereabout, means on said base defining a second annular raceway vertically spaced from said first raceway, a plurality of antifriction ball elements interposed between said raceways, said ball elements each having a diameter less by a predetermined amount than the distance between said raceways, and an air lift system in said base for applying pressure between said support surfaces to selectively lift said platen vertically with respect to said base so as to bring both said raceways into engagement with said antifriction members, whereby said platen may be rotated on said center post.

2. A rotary index table for a machine tool comprising, in combination, a base, an unlubricated support face on said base, a platen pivotally mounted on said base and disposed for indexing movement relative thereto about a given axis, said platen normally resting on said support face, a first annular raceway fixed to said platen, and coaxial therewith, a second annular raceway fixed to said base in overlying relation with said first raceway and coaxial therewith, a plurality of antifriction elements disposed in annnular pattern between said annular raceways, each of said elements having a diameter less than the distance between said raceways by a given clearance distance, and an air lift system for selectively lifting said platen from said base support face by an amount equal to said given clearance distance to permit indexing of said platen with said antifriction elements in contact with both said raceways.

3. A rotary index table for a machine tool and comprising, in combination, a base having a support surface, a platen having a support surface in face-to-face relation with said support surface of said base, a center post interposed between said base and said platen, said platen being journaled on said center post for relative rotation and limited axial movement with respect to said base, a peripheral annular flange depending from said platen, a first annular raceway fixed to said flange, an annular second raceway fixed to said base and vertically spaced from said first raceway, a plurality of antifriction elements interposed between said raceways, each said element being of a predetermined diameter less than the vertical distance between said raceways, an air pressure system communicating with said support surfaces for raising said platen from said base so as to bring said antifriction members into bearing relation with said raceways, whereby said platen may be rotated with respect to said base.

4. A rotary index table for a machine tool comprising, in combination, a base, a support face on said base, a work holding platen journaled on said base and disposed for axial movement relative thereto, a support face on said platen opposed to said support face of said base, an air lift system for selectively lifting said platen from said base to permit indexing of said platen, said system being effective while said opposed support faces are separated at any peripheral point by an amount not exceeding a predetermined maximum separation distance, and a ball thrust bearing interposed between said base and said platen, said ball thrust bearing having an internal clearance equal to said maximum separation distance.

5. A rotary air lift index table for a machine tool and comprising, in combination, a base having a flat support surface, a platen disposed on said base and presenting a flat support surface in normal face-to-face relation with said support surface on said base, a center post interposed between said base and platen upon which said platen is mounted for rotation and limited vertical movement, said platen having a peripherally disposed depending annular flange, a first raceway projecting inwardly from said flange, a second raceway projecting outwardly from said base and spaced axially from said first raceway, a plurality of antifriction balls interposed and filling the space between said raceways, said balls each being of a predetermined diameter less than the axial spacing between said raceways, an air pressure system communicating with said support surfaces for raising said platen from said base so as to bring said antifriction balls into bearing relation with said raceways, whereby said platen may be indexed with respect to said base.

6. A rotary index table for a machine tool comprising, in combination, a base, an unlubricated support face on said base, a platen mounted on said base and disposed for pivotal movement relative thereto, said platen normally resting on said support face, a first annular raceway fixed to said platen, a second annular raceway fixed to said base and spaced axially from said first raceway, a plurality of antifriction balls disposed between said annular raceways, each of said balls having a diameter less than the distance between said raceways by a given clearance distance, and an air lift system for lifting said platen from said base support face by an amount equal to said given clearance distance to permit indexing of said platen, and stop means on said base for selectively positioning said table with respect thereto.

7. A rotary index table suitable for use with a machine tool and comprising, in combination, a base, a platen, a center post for mounting said platen to said base providing for limited vertical movement and relative rotation therebetween, said platen and said base having opposed support surfaces normally in contact, means on said platen defining a first raceway, means on said base defining a second raceway spaced axially from said first raceway, a plurality of antifriction elements disposed in said raceway and having a diameter less by a predetermined amount than the axial spacing between said raceways, and an air lift system for applying pressure between said opposed support surfaces to lift said platen vertically with respect to said base so as to bring said antifriction members into engagement with both said raceways whereby said platen may be rotated on said center post.

8. A rotary air lift index table for a machine tool as set forth in claim 2 and further comprising stop means on said base for selectively positioning said platen with respect thereto, and clamp means for holding said platen and base in the relative position so selected.

9. A rotary air lift index table for a machine tool and comprising, in combination, a base member having a flat support surface, a platen disposed on said base and presenting a flat support surface in normal face-to-face relation with said support surface on said base, a center post between said base and platen upon which said platen is mounted for rotation and limited vertical movement, said platen having a peripherally disposed depending annular flange, a first raceway projecting inwardly from said flange, a second raceway fixed to said base and spaced axially from said first raceway, a plurality of antifriction elements interposed between said raceways, each said element being of a predetermined diameter less than the axial spacing between said raceways, an air pressure system communicating with said support surfaces for raising said platen from said base so as to bring said antifriction elements into bearing relation with said raceways, whereby said platen may be rotated with respect to said base, and stop pin means on said base for selectively positioning said platen with respect thereto.

References Cited

UNITED STATES PATENTS

| | | | |
|---|---|---|---|
| 2,417,567 | 3/1947 | Ray | 308—222 |
| 2,787,175 | 4/1957 | Schurger. | |

FOREIGN PATENTS

| | | |
|---|---|---|
| 568,455 | 6/1958 | Belgium. |

ROBERT C. RIORDON, *Primary Examiner.*

J. F. McKEOWN, *Assistant Examiner.*